US012682568B2

(12) United States Patent
Zhang et al.

(10) Patent No.: US 12,682,568 B2
(45) Date of Patent: Jul. 14, 2026

(54) GENERATING COMPLETE THREE-DIMENSIONAL SCENE GEOMETRIES USING MACHINE LEARNING

(71) Applicant: NVIDIA CORPORATION, Santa Clara, CA (US)

(72) Inventors: Dongsu Zhang, Seoul (KR); Amlan Kar, Toronto (CA); Francis Williams, Brooklyn, NY (US); Zan Gojcic, Zurich (CH); Karsten Kreis, Vancouver (CA); Sanja Fidler, Toronto (CA)

(73) Assignee: NVIDIA CORPORATION, Santa Clara, CA (US)

( * ) Notice: Subject to any disclaimer, the term of this patent is extended or adjusted under 35 U.S.C. 154(b) by 260 days.

(21) Appl. No.: 18/339,936

(22) Filed: Jun. 22, 2023

(65) Prior Publication Data

US 2024/0185523 A1     Jun. 6, 2024

Related U.S. Application Data

(60) Provisional application No. 63/429,275, filed on Dec. 1, 2022.

(51) Int. Cl.
*G06T 17/10*          (2006.01)

(52) U.S. Cl.
CPC ................................... *G06T 17/10* (2013.01)

(58) Field of Classification Search
CPC . G06T 17/10; G06T 2219/2021; G06T 19/20; G06T 17/00; G06F 2111/18; G06F 30/20; G06F 30/27
See application file for complete search history.

(56) References Cited

U.S. PATENT DOCUMENTS

| | | | | |
|---|---|---|---|---|
| 9,235,920 B2 * | 1/2016 | Girdzijauskas | ........... | G06T 7/97 |
| 11,741,643 B2 * | 8/2023 | Kim | ........................ | G06T 7/207 |
| | | | | 345/424 |
| 2020/0033880 A1 * | 1/2020 | Kehl | ...................... | G06N 3/006 |

(Continued)

OTHER PUBLICATIONS

Dai, Angela, et al. "Scancomplete: Large-scale scene completion and semantic segmentation for 3d scans." Proceedings of the IEEE Conference on Computer Vision and Pattern Recognition. 2018. (Year: 2018).*

(Continued)

*Primary Examiner* — Daniel F Hajnik
*Assistant Examiner* — Chris Alejandro Puntier
(74) *Attorney, Agent, or Firm* — Squire Patton Boggs LLP; Sarah Mirza

(57)          ABSTRACT

In various examples, a technique for performing three-dimensional (3D) scene completion includes determining an initial representation of a first 3D scene. The technique also includes executing a machine learning model to generate a first update to the initial representation at a previous time step and a second update to the initial representation at a current time step, wherein the second update is generated based at least on a threshold applied to a set of predictions corresponding to the first update. The technique also includes generating a 3D model of the 3D scene based at least on the second update to the initial representation.

18 Claims, 11 Drawing Sheets

(56) References Cited

U.S. PATENT DOCUMENTS

2023/0281913 A1* 9/2023 Rematas ............... G06T 7/55
345/419

OTHER PUBLICATIONS

Chen, Yukang, et al. "Focal sparse convolutional networks for 3d object detection." Proceedings of the IEEE/CVF conference on computer vision and pattern recognition. 2022. (Year: 2022).*
Wu, Shun-Cheng, et al. "Scfusion: Real-time incremental scene reconstruction with semantic completion." 2020 International Conference on 3D Vision (3DV). IEEE, 2020. (Year: 2020).*
Arora et al., "Multimodal Shape Completion via IMLE", arXiv.2106.16237, Jul. 7, 2021, 16 pages.
Bautista et al., "GAUDI: A Neural Architect for Immersive 3D Scene Generation", arXiv.2207.13751, Jul. 27, 2022, 21 pages.
Behley et al., "SemanticKITTI: A Dataset for Semantic Scene Understanding of LiDAR Sequences", In Proceedings of the IEEE/CVF International Conference on Computer Vision (ICCV), DOI: 10.1109/ICCV.2019.00939, 2019, pp. 9296-9306.
Bordes et al., "Learning to Generate Samples from Noise through Infusion Training", In ICLR, 2017, 4 pages.
Brock et al., "Large Scale Gan Training for High Fidelity Natural Image Synthesis", arXiv.1809.11096, Sep. 28, 2018, 29 pages.
Cai et al., "Learning Gradient Fields for Shape Generation", arXiv:2008.06520, Aug. 18, 2020, 33 pages.
Chabra et al., "Deep Local Shapes: Learning Local SDF Priors for Detailed 3D Reconstruction", arXiv:2003.10983, Aug. 21, 2020, 26 pages.
Chang et al., "ShapeNet: An Information-Rich 3D Model Repository", arXiv:1512.03012, Dec. 9, 2015, 11 pages.
Chen et al., "Learning Implicit Fields for Generative Shape Modeling", In Proceedings of the IEEE/CVF Conference on Computer Vision and Pattern Recognition (CVPR), DOI: 10.1109/CVPR.2019.00609, 2019, pp. 5932-5941.
Cheng et al., "S3CNet: A Sparse Semantic Scene Completion Network for LiDAR Point Clouds", In 4th Conference on Robot Learning (CoRL 2020), 2020, 14 pages.
Dai et al., "SG-NN: Sparse Generative Neural Networks for Self-Supervised Scene Completion of RGB-D Scans", In Proceedings of the IEEE/CVF Conference on Computer Vision and Pattern Recognition (CVPR), DOI: 10.1109/CVPR42600.2020.00093, 2020, pp. 846-855.
Dai et al., "Shape Completion using 3D-Encoder-Predictor CNNs and Shape Synthesis", In Proceedings of the IEEE Conference on Computer Vision and Pattern Recognition, DOI: 10.1109/CVPR.2017.693, 2017, pp. 6545-6554.
Dai et al., "ScanComplete: Large-Scale Scene Completion and Semantic Segmentation for 3D Scans", In Proceedings of the IEEE Conference on Computer Vision and Pattern Recognition, DOI: 10.1109/CVPR.2018.00481, 2018, pp. 4578-4587.
Gao et al., "GET3D: A Generative Model of High Quality 3D Textured Shapes Learned from Images", In 36th Conference on Neural Information Processing Systems (NeurIPS 2022), arXiv:2209.11163, Sep. 22, 2022, 39 pages.
Graham et al., "3D Semantic Segmentation with Submanifold Sparse Convolutional Networks", In Proceedings of the IEEE/CVF Conference on Computer Vision and Pattern Recognition, DOI: 10.1109/CVPR.2018.00961, 2018, pp. 9224-9232.
Gu et al., "Weakly-supervised 3D Shape Completion in the Wild", arXiv:2008.09110, Aug. 20, 2020, 28 pages.
Henzler et al., "Escaping Plato's Cave: 3D Shape From Adversarial Rendering", In Proceedings of the IEEE/CVF International Conference on Computer Vision (ICCV), DOI: 10.1109/ICCV.2019.01008, 2019, pp. 9983-9992.
Ho et al., "Denoising Diffusion Probabilistic Models", In 34th Conference on Neural Information Processing Systems (NeurIPS 2020), arXiv:2006.11239, Dec. 16, 2020, 25 pages.

Jiang et al., "Local Implicit Grid Representations for 3D Scenes", In Proceedings of the IEEE/CVF Conference on Computer Vision and Pattern Recognition (CVPR), DOI: 10.1109/CVPR42600.2020.00604, 2020, pp. 6000-6009.
Kar et al., "Meta-Sim: Learning to Generate Synthetic Datasets", In Proceedings of the IEEE/CVF International Conference on Computer Vision (ICCV), DOI: 10.1109/ICCV.2019.00465, 2019, pp. 4550-4559.
Kim et al., "DriveGAN: Towards a Controllable High-Quality Neural Simulation", In Proceedings of the IEEE/CVF Conference on Computer Vision and Pattern Recognition (CVPR), DOI: 10.1109/CVPR46437.2021.00576, 2021, pp. 5816-5825.
Manivasagam et al., "LiDARsim: Realistic LiDAR Simulation by Leveraging the Real World", arXiv:2006.09348, Jun. 16, 2020, 11 pages.
Mescheder et al., "Occupancy Networks: Learning 3D Reconstruction in Function Space", In Proceedings of the IEEE/CVF Conference on Computer Vision and Pattern Recognition, DOI: 10.1109/CVPR.2019.00459, 2019, pp. 4455-4465.
Michalkiewicz et al., "Deep Level Sets: Implicit Surface Representations for 3D Shape Inference" arXiv:1901.06802, Jan. 21, 2019, 10 pages.
Mordvintsev et al., "Growing Neural Cellular Automata", Distill, DOI: 10.23915/distill.00023, Feb. 11, 2020, 23 pages.
Newcombe et al., "KinectFusion: Real-Time Dense Surface Mapping and Tracking", In Proceedings of the 10th IEEE International Symposium on Mixed and Augmented Reality, DOI: 10.1109/ISMAR.2011.6092378, Oct. 26-29, 2011, pp. 127-136.
Park et al., "DeepSDF: Learning Continuous Signed Distance Functions for Shape Representation", In Proceedings of the IEEE/CVF Conference on Computer Vision and Pattern Recognition (CVPR), DOI: 10.1109/CVPR.2019.00025, 2019, pp. 165-174.
Rist et al., "Semantic Scene Completion using Local Deep Implicit Functions on LiDAR Data", arXiv:2011.09141, Apr. 12, 2021, 19 pages.
Ruiz et al., "Learning to Simulate", In ICLR, arXiv:1810.02513, Oct. 5, 2018, 12 pages.
Sohl-Dickstein et al., "Deep Unsupervised Learning using Nonequilibrium Thermodynamics", In Proceedings of the 32nd International Conference on International Conference on Machine Learning, vol. 37, arXiv:1503.03585, Jul. 9, 2015, 17 pages.
Song et al., "Semantic Scene Completion from a Single Depth Image", In Proceedings of the IEEE/CVF Conference on Computer Vision and Pattern Recognition (CVPR), DOI: 10.1109/CVPR.2017.28, 2017, pp. 190-198.
Peng et al., "Convolutional Occupancy Networks", arXiv:2003.04618, Aug. 1, 2020, 17 pages.
Sun et al., "Scalability in Perception for Autonomous Driving: Waymo Open Dataset", In Proceedings of the IEEE/CVF Conference on Computer Vision and Pattern Recognition (CVPR), DOI: 10.1109/CVPR42600.2020.00252, 2020, pp. 2443-2451.
Tancik et al., "Block-NeRF: Scalable Large Scene Neural View Synthesis", In Proceedings of the IEEE/CVF Conference on Computer Vision and Pattern Recognition (CVPR), DOI: 10.1109/CVPR52688.2022.00807, 2022, pp. 8248-8258.
Vizzo et al., "Make it Dense: Self-Supervised Geometric Scan Completion of Sparse 3D LiDAR Scans in Large Outdoor Environments", In IEEE Robotics and Automation Letters, vol. 7, No. 3, Jul. 2022, pp. 8534-8541.
Neumann, John Von, "Theory of Self-Reproducing Automata", 1966, 403 pages.
Wu et al., "Learning a Probabilistic Latent Space of Object Shapes via 3D Generative-Adversarial Modeling", In 29th Conference on Neural Information Processing Systems (NIPS 2016), arXiv:1610.07584, Oct. 24, 2016, 11 pages.
Wu et al., "Multimodal Shape Completion via Conditional Generative Adversarial Networks", arXiv:2003.07717, Jul. 8, 2020, 22 pages.
Yan et al., "Sparse Single Sweep LiDAR Point Cloud Segmentation via Learning Contextual Shape Priors from Scene Completion", In the Thirty-Fifth AAAI Conference on Artificial Intelligence (AAAI-21), 2021, pp. 3101-3109.

(56) References Cited

OTHER PUBLICATIONS

Yang et al., "PointFlow: 3D Point Cloud Generation with Continuous Normalizing Flows", In Proceedings of the IEEE/CVF International Conference on Computer Vision (ICCV), DOI: 10.1109/ICCV.2019.00464, 2019, pp. 4540-4549.

Yang et al., "SurfelGAN: Synthesizing Realistic Sensor Data for Autonomous Driving", In Proceedings of the IEEE/CVF Conference on Computer Vision and Pattern Recognition (CVPR), DOI: 10.1109/CVPR42600.2020.01113, 2020, pp. 11118-11127.

Yuan et al., "PCN: Point Completion Network", In International Conference on 3D Vision (3DV), DOI: 10.1109/3DV.2018.00088, 2018, pp. 728-737.

Zeng et al., "LION: Latent Point Diffusion Models for 3D Shape Generation", In 36th Conference on Neural Information Processing Systems (NeurIPS 2022), arXiv:2210.06978, Oct. 12, 2022, 63 pages.

Zhang et al., "Learning to Generate 3D Shapes With Generative Cellular Automata", in ICLR 2021, arXiv:2103.04130, Mar. 6, 2021, 22 pages.

Zhang et al., "Probabilistic Implicit Scene Completion", In ICLR 2022, arXiv:2204.01264, Apr. 4, 2022, 32 pages.

Zhou et al., "3D Shape Generation and Completion through Point-Voxel Diffusion", In Proceedings of the IEEE/CVF International Conference on Computer Vision (ICCV), DOI: 10.1109/ICCV48922.2021.00577, 2021, pp. 5806-5815.

Choy et al., "4D Spatio-Temporal ConvNets: Minkowski Convolutional Neural Networks", In Proceedings of the IEEE/CVF Conference on Computer Vision and Pattern Recognition (CVPR), DOI: 10.1109/CVPR.2019.00319, 2019, pp. 3075-3084.

Cuturi, Marco, "Sinkhorn Distances: Lightspeed Computation of Optimal Transport", In Proceedings of the 26th International Conference on Neural Information Processing Systems, 2013, 9 pages.

Fan et al., "A Point Set Generation Network for 3D Object Reconstruction from a Single Image", arXiv:1612.00603, Dec. 7, 2016, 12 pages.

Insafutdinov et al., "Unsupervised Learning of Shape and Pose with Differentiable Point Clouds", In 32nd Conference on Neural Information Processing Systems (NIPS 2018), arXiv:1810.09381, Oct. 22, 2018, 16 pages.

Kingma et al., "Adam: A Method For Stochastic Optimization", In ICLR 2015, arXiv:1412.6980, Jul. 23, 2015, 15 pages.

Liu et al., "Morphing and Sampling Network for Dense Point Cloud Completion", arXiv:1912.00280, Nov. 30, 2019, 9 pages.

Lorensen et al., "Marching Cubes: A High Resolution 3D Surface Construction Algorithm", ACM SIGGRAPH Computer Graphics, vol. 21, No. 4, DOI: 10.1145/37402.37422, Jul. 1987, pp. 163-169.

Paszke et al., "PyTorch: An Imperative Style, High-Performance Deep Learning Library", In 33rd Conference on Neural Information Processing Systems (NeurIPS 2019), arXiv:1912.01703, Dec. 3, 2019, 12 pages.

Qi et al., "Frustum PointNets for 3D Object Detection from RGB-D Data", arXiv:1711.08488, Nov. 22, 2017, 15 pages.

Ronneberger et al., "U-Net: Convolutional Networks for Biomedical Image Segmentation", arXiv:1505.04597, May 18, 2015, 8 pages.

Sun et al., "Scalability in Perception for Autonomous Driving: An Open Dataset Benchmark", arXiv:1912.04838, Dec. 10, 2019, 9 pages.

* cited by examiner

Visible & Occupied ⊕
Visible & Unoccupied ●
Invisible & Occupied ⊗
Invisible & Unoccupied ⊖

STEREO CAMERA 568

MID-RANGE CAMERA, WING MIRROR MOUNT 598

SURROUND CAMERA 574

MID-RANGE CAMERA, WING MIRROR MOUNT 598

SURROUND CAMERA(S) 574

SURROUND CAMERA(S) 574

500

INFRARED CAMERA 572

WIDE VIEW CAMERA 570

LONG-RANGE CAMERA 598

LONG-RANGE CAMERA 598

STEREO CAMERA 568

700

GENERATING COMPLETE THREE-DIMENSIONAL SCENE GEOMETRIES USING MACHINE LEARNING

CROSS-REFERENCE TO RELATED APPLICATIONS

This application claims the benefit of U.S. Provisional Application No. 63/429,275, filed on Dec. 1, 2022, which is hereby incorporated by reference in its entirety.

BACKGROUND

An autonomous or semi-autonomous vehicle is typically equipped with cameras, depth sensors, and/or other sensors that are used to detect and understand the environment around the vehicle. Data collected by the sensors is used by downstream components to make important decisions related to stopping the vehicle, starting the vehicle, controlling the speed of the vehicle, determining a path to be taken by the vehicle, disengaging an autonomous driving mode on the vehicle, and/or otherwise operating the vehicle. Consequently, creating diverse and realistic three-dimensional (3D) environments is critical for conducting simulations that are used to develop, test, or verify the operation of an autonomous or semi-autonomous vehicle.

Conventionally, 3D environments have been created manually using 3D modeling software, which is resource-intensive and requires domain-specific modeling expertise. Other approaches that involve densely scanning real-world 3D environments are associated with similar limitations in scalability and resource overhead. To alleviate some of this overhead, procedural generation techniques have been developed to automatically create new 3D environments. However, these procedurally generated models are limited in diversity and therefore cannot be used to simulate the full range of conditions that an autonomous or semi-autonomous vehicle can be expected to encounter.

More recently, machine learning techniques have been employed to develop deep neural networks that are capable of completing or synthesizing 3D shapes. However, these techniques are limited to individual 3D objects or a small set of object classes instead of 3D environments that include complex arrangements of different types of objects. These techniques also, or instead, require complete "ground truth" representations of the 3D shapes, which are difficult to acquire for crowded outdoor environments that typically occlude many objects or portions of objects from 3D scanning devices.

As such, a need exists for more effective techniques for improving the creation of 3D environments.

SUMMARY

Embodiments of the present disclosure relate to generating geometries for three-dimensional (3D) scenes in systems and applications for generative artificial intelligence (AI). The techniques described herein include determining an initial representation of a first 3D scene. The techniques also include executing a machine learning model to generate a first update to the initial representation at a previous time step and a second update to the initial representation at a current time step, wherein the second update is generated based at least on a threshold applied to a set of predictions corresponding to the first update. The techniques further include generating a 3D model of the 3D scene based at least on the second update to the initial representation.

One technical advantage of the disclosed techniques relative to prior approaches is the ability to generate complete geometries of complex 3D scenes from partial geometries for the same 3D scenes. Consequently, the disclosed techniques can be used to create diverse and realistic 3D environments for use in simulations, training additional machine learning models, or content creation (e.g., asset design in games and/or for virtual reality, augmented reality, mixed reality, and/or other applications) without performing time- and resource-intensive 3D modeling or 3D scanning operations. Additionally, the disclosed techniques can be used to train a machine learning model to generate complete geometries for 3D shapes, given training data that includes incomplete representations of the 3D shapes. The machine learning model is thus able to generate a greater diversity of 3D shapes than a conventional machine learning model that is trained using a smaller set of complete geometries for 3D shapes.

BRIEF DESCRIPTION OF THE DRAWINGS

The present systems and methods for generative cellular automata for three-dimensional (3D) scene completion are described in detail below with reference to the attached drawing figures, wherein.

DETAILED DESCRIPTION

Figure 1:
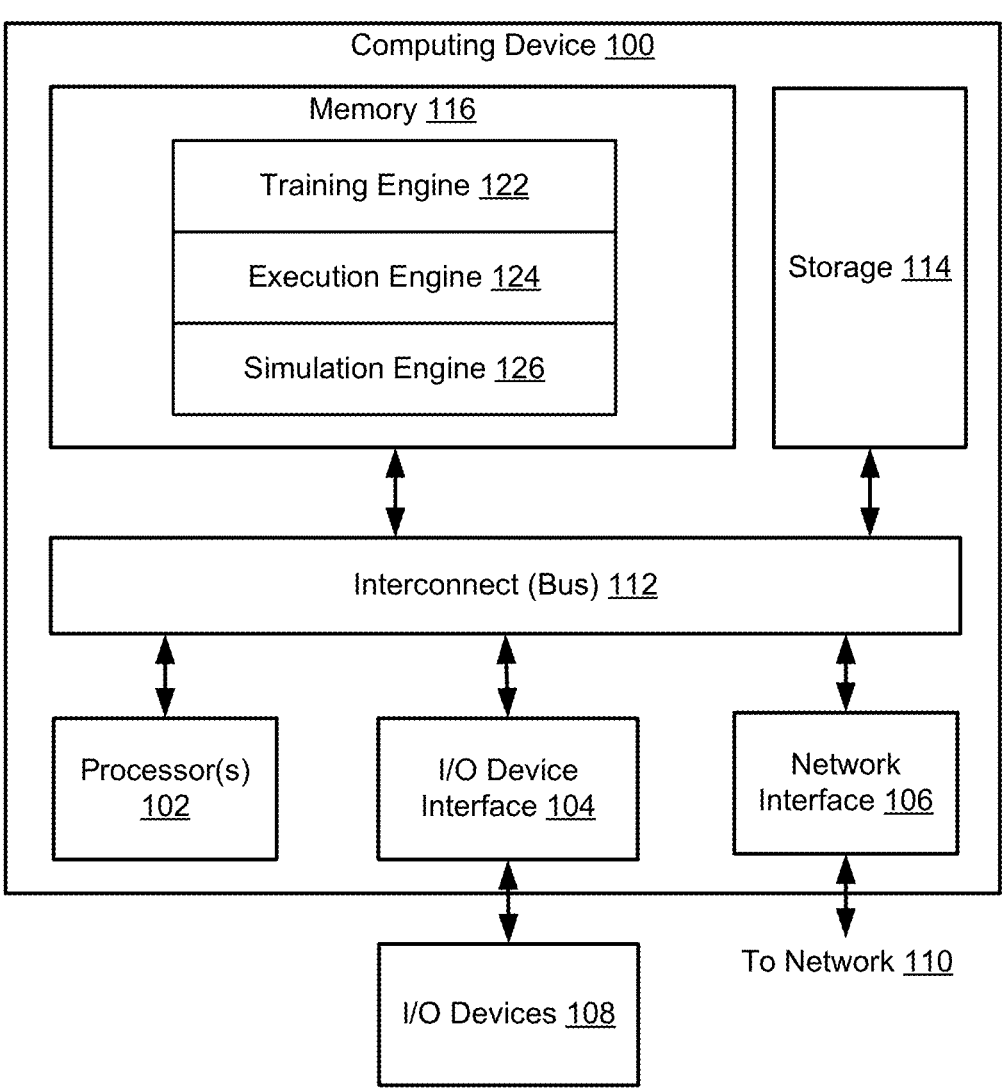
FIG. 1 illustrates a computing device configured to implement one or more aspects of various embodiments.

Systems and methods are disclosed for generating geometries for three-dimensional (3D) scenes. Although the present disclosure may be described with respect to an example autonomous vehicle or semi-autonomous vehicle or machine 500 (alternatively referred to herein as "vehicle 500" or "ego-vehicle 500," an example of which is described with respect to FIGS. 5A-5D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to 3D scene completion for simulations related to the operation of an autonomous or semi-autonomous vehicle, this is not intended to be limiting, and the systems and methods described herein may be used in augmented reality, virtual reality, mixed reality, robotics, security and surveillance, autonomous or semi-autonomous machine applications, and/or any other technology spaces where 3D scene completion may be used.

As discussed herein, conventional techniques for generating 3D environments involve manually modeling or densely scanning the 3D environments, which is time-consuming, resource-intensive, and difficult to scale. Procedural generation techniques are capable of automatically synthesizing new 3D environments but are limited in diversity and therefore cannot be used to simulate the full range of conditions that an autonomous or semi-autonomous vehicle can be expected to encounter. Further, machine learning techniques that complete or synthesize individual 3D shapes are typically limited to individual 3D objects or a small set of object classes. These machine learning techniques also, or instead, require complete "ground truth" representations of the 3D shapes, which can be difficult to acquire in crowded outdoor environments that occlude many objects or portions of objects from 3D scanning devices.

To improve the synthesis or completion of 3D environments, the disclosed techniques train and execute a machine learning model to iteratively convert an incomplete representation of a 3D scene into a more complete representation of the same 3D scene. For example, the machine learning model may incrementally "grow" a set of cells depicting a partial light detection and ranging (LiDAR) scan of humans, buildings, cars, objects, terrain, or other components of the 3D scene into more complete representations of the components, including portions or sides of the components that were not captured by the partial LiDAR scan.

The machine learning model may include, in one or more embodiments, a sparse convolutional neural network (CNN) and/or another type of deep learning model that iteratively updates a set of states for a new set of cells within a certain distance or neighborhood of a "current" set of cells for which states have already been determined. The set of states includes predicted probabilities of occupancies (or other discretized representations of 3D shapes or surfaces of shapes) for the new set of cells. After states are determined for a new set of cells, the new set of cells is added to the current set of cells, and the process is repeated for a predetermined number of steps.

The machine learning model is trained to predict a series of intermediate states between a first representation of a training 3D scene and a second representation of the training 3D scene. The first representation may include partial geometry for the training 3D scene that is derived from a single scan or a subset of LiDAR scans of the training 3D scene, and the second representation may include a denser but still incomplete geometry for the training 3D scene that is derived from complete set of scans of the training 3D scene. The machine learning model can also be trained using a loss function that is computed using points that are visible in the 3D scans. When the machine learning model is trained using a dataset of incomplete geometries derived from a large number of accumulated LiDAR scans, the machine learning model is able to learn to complete geometries for various types of objects in the training 3D scenes across the dataset. For example, training the machine learning model to generate different portions of cars, trees, buildings, or other types of objects in the training 3D scenes may allow the machine learning model to learn to generate complete geometries for these objects in other 3D scenes.

One technical advantage of the disclosed techniques relative to prior approaches is the ability to generate complete geometries of complex 3D scenes from partial geometries for the same 3D scenes. Consequently, the disclosed techniques can be used to create diverse and realistic 3D environments for use in simulations, synthetic data generation, content creation, games, virtual reality (VR), augmented reality (AR), mixed reality (MR), and/or other applications without performing time- and resource-intensive 3D modeling or 3D scanning operations. Additionally, the disclosed techniques can be used to train a machine learning model to generate complete geometries for various types of 3D shapes, given training data that includes incomplete representations of the same types of 3D shapes. The machine learning model is thus able to generate a greater diversity of 3D shapes than a conventional machine learning model that is trained using a smaller set of complete geometries for 3D shapes.

FIG. 1 illustrates a computing device 100 configured to implement one or more aspects of various embodiments. In at least one embodiment, computing device 100 includes a desktop computer, a laptop computer, a smart phone, a personal digital assistant (PDA), a tablet computer, a server, one or more virtual machines, and/or any other type of computing device configured to receive input, process data, and optionally display images, and is suitable for practicing one or more embodiments. Computing device 100 is configured to run a training engine 122, an execution engine 124, and a simulation engine 126 that may reside in a memory 116. It is noted that the computing device described herein is illustrative and that any other technically feasible configurations fall within the scope of the present disclosure. For example, multiple instances of training engine 122, execution engine 124, and/or simulation engine 126 may execute on a set of nodes in a distributed and/or cloud computing system to implement the functionality of computing device 100. Alternatively, computing device 100 may be implemented similar to that of the computing device of the example autonomous or semi-autonomous machine 500 described at least with respect to FIGS. 5A-5D.

In one or more embodiments, computing device 100 includes, without limitation, an interconnect (bus) 112 that connects one or more processors 102, an input/output (I/O) device interface 104 coupled to one or more input/output (I/O) devices 108, memory 116, a storage 114, and/or a network interface 106. Processor(s) 102 may include any suitable processor implemented as a central processing unit (CPU), a graphics processing unit (GPU), an application-specific integrated circuit (ASIC), a field programmable gate array (FPGA), an artificial intelligence (AI) accelerator, a parallel processing unit (PPU), a data processing unit (DPU), any other type of processing unit, or a combination of different processing units, such as a CPU(s) configured to operate in conjunction with a GPU(s). In general, processor(s) 102 may include any technically feasible hardware unit capable of processing data and/or executing software applications. Further, in the context of this disclosure, the computing elements shown in computing device 100 may correspond to a physical computing system (e.g., a system in a data center) and/or may correspond to a virtual computing instance executing within a computing cloud.

In at least one embodiment, I/O devices 108 include devices capable of receiving input, such as a keyboard, a mouse, a touchpad, a VR/MR/AR headset, a gesture recognition system, a steering wheel, mechanical, digital, or touch sensitive buttons or input components, and/or a microphone, as well as devices capable of providing output, such as a display device, haptic device, and/or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In some embodiments, network 110 is any technically feasible type of communications network that allows data to be exchanged between computing device 100 and internal, local, remote, or external entities or devices, such as a web server or another networked computing device. For example, network 110 may include a wide area network (WAN), a local area network (LAN), a wireless (e.g., WiFi) network, and/or the Internet, among others.

In at least one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Training engine 122, execution engine 124, and/or simulation engine 126 may be stored in storage 114 and loaded into memory 116 when executed.

In one or more embodiments, memory 116 includes a random-access memory (RAM) module, a flash memory unit, and/or any other type of memory unit or combination thereof. Processor(s) 102, I/O device interface 104, and network interface 106 may be configured to read data from and write data to memory 116. Memory 116 may include various software programs that can be executed by processor(s) 102 and application data associated with said software programs, including training engine 122, execution engine 124, and/or simulation engine 126.

Training engine 122 includes functionality to train a machine learning model to iteratively convert an incomplete representation of a two-dimensional (2D), three-dimensional (3D), and/or another type of geometry for a shape into a more complete representation of the same shape. For example, training engine 122 may train the machine learning model to incrementally "grow" a set of cells depicting a partial LiDAR scan of humans, buildings, cars, objects, terrain, or other components of a 3D geometry for an outdoor scene into fuller representations of the components within the 3D geometry, including portions or sides of the components that were not captured by the partial LiDAR scan.

Execution engine 124 includes functionality to execute the trained machine learning model to iteratively generate additional completions of shapes. For example, execution engine 124 may use the trained machine learning model to convert one or more LIDAR scans of a given 3D scene (e.g., an outdoor environment around an automotive vehicle) into a realistic completion of the 3D scene.

Simulation engine 126 uses the completed shapes outputted by the trained machine learning model to conduct simulations related to the completed shapes. For example, simulation engine 126 may use 3D geometries for outdoor scenes generated by the machine learning model to test or verify the operation of a non-autonomous, semi-autonomous, or autonomous vehicle or machine. In another example, simulation engine 126 may use geometries generated by the machine learning model for cars, trees, buildings, mechanical parts, or other types of objects to conduct simulations related to movement, collisions, structural load, fluid dynamics, or other types of physics associated with the objects.

Figure 2:
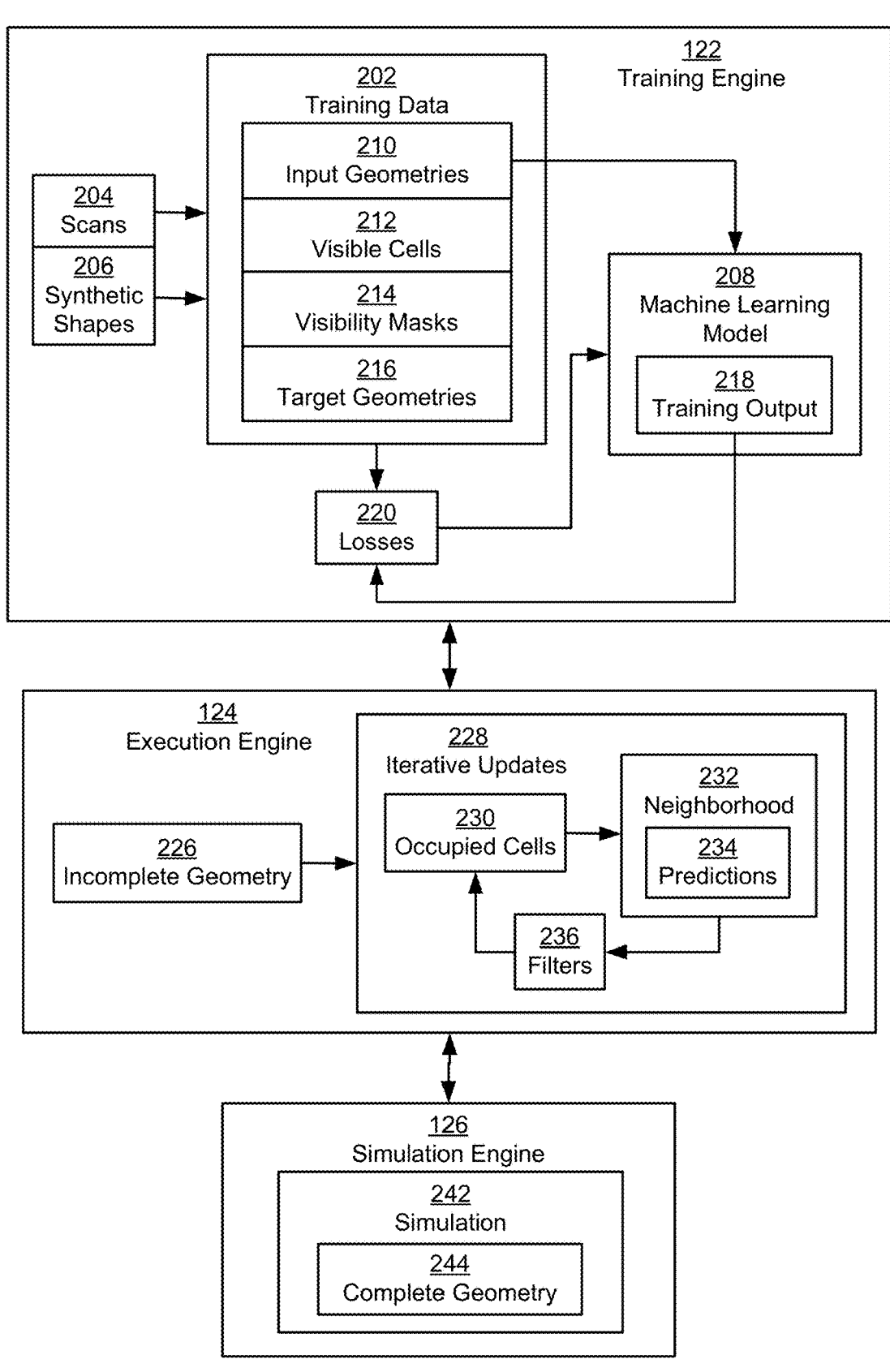
FIG. 2 is a more detailed illustration of the training engine, execution engine, and simulation engine of FIG. 1, according to various embodiments.

FIG. 2 is a more detailed illustration of training engine 122, execution engine 124, and simulation engine 126 of FIG. 1, according to various embodiments. As mentioned above, training engine 122 and execution engine 124 operate to train and execute a machine learning model 208 to generate completions of objects or scenes, given input that includes partial or incomplete representations of the objects or scenes.

As shown in FIG. 2, machine learning model 208 receives input that includes an incomplete geometry 226 for one or more objects, an indoor space, an outdoor environment, and/or another type of 2D, 3D, and/or n-dimensional shape. Given this incomplete geometry 226, machine learning model 208 performs a series of iterative updates 228 to a set of occupied cells 230 corresponding to pixels, voxels, or other portions of space that are "occupied" by the surface and/or interior of the shape. Each update included in the series of iterative updates 228 includes predictions 234 for portions of space that reside within a neighborhood 232 of a current set of occupied cells 230.

In one or more embodiments, machine learning model 208 includes a generative deep learning model that operates using a generative cellular automata (GCA) framework. This GCA framework utilizes an n-dimensional uniform grid space denoted by $\mathbb{Z}^n$, where n=3 for a 3D voxel space. Within the uniform grid space, an n-dimensional shape can be represented as a state $s=\{(c, o_c)|c\in\mathbb{Z}^n, o_c\in 0,1\}$, where $o_c$ denotes the occupancy of a grid cell with coordinates c. An occupancy that is set to 0 indicates that the grid cell is not occupied by the surface and/or interior of the shape, and an occupancy that is set to 1 indicates that the grid cell is occupied by the surface and/or interior of the shape.

Given an observed, incomplete state $s^0$ associated with the shape (e.g., incomplete geometry 226), the GCA framework generates a completed state $s^T$ by drawing a sequence of state variables $s^{0:T}$ from the following Markov chain over a predefined number of time steps T:

$$s^0 \sim p^0, s^{t+1} \sim p_\theta(s^{t+1}|s^t) \qquad (1)$$

In the above equation, $p^0$ is an initial distribution, and $p_\theta$ is a local transition kernel with parameters $\theta$. The sampled sequence $s^0 \rightarrow s^1 \rightarrow \ldots \rightarrow s^T$ is denoted as a "sampling chain" that iteratively mends the shape represented by occupied cells 230 to a learned distribution.

In one or more embodiments, the objective of the GCA framework is to learn parameters $\theta$ of the transition kernel $p_\theta$ so that the marginal distribution of completed states $p(s^T) = \Sigma_{s^{0:T-1}} \, p^0(s^0) \, \Pi_{0 \le t < T} p_\theta(s^{t+1} | s^t)$ is close to the distribution of a set of target geometries 216 in training data 202 for machine learning model 208. For example, the GCA framework may be used to train machine learning model 208 to generate completed states that correspond to realistic depictions of cars, buildings, trees, sidewalks, pedestrians, and/or other components of outdoor scenes, given training data 202 that includes target geometries 216 for various outdoor scenes.

In some embodiments, machine learning model 208 includes a sparse convolutional network (CNN) that performs each of iterative updates 228 by computing the transition kernel for cells within a given neighborhood 232 $\mathcal{N}$ of the current set of occupied cells 230:

$$\mathcal{N}(s^t) = \{c' \in \mathbb{Z}^n | d(c, c') \le r, o_c = 1\} \qquad (2)$$

In the above equation, neighborhood 232 includes a set of cells c' for which a distance metric d between these cells and the current set of occupied cells 230 is less than or equal to a radius r.

Figure 3A:
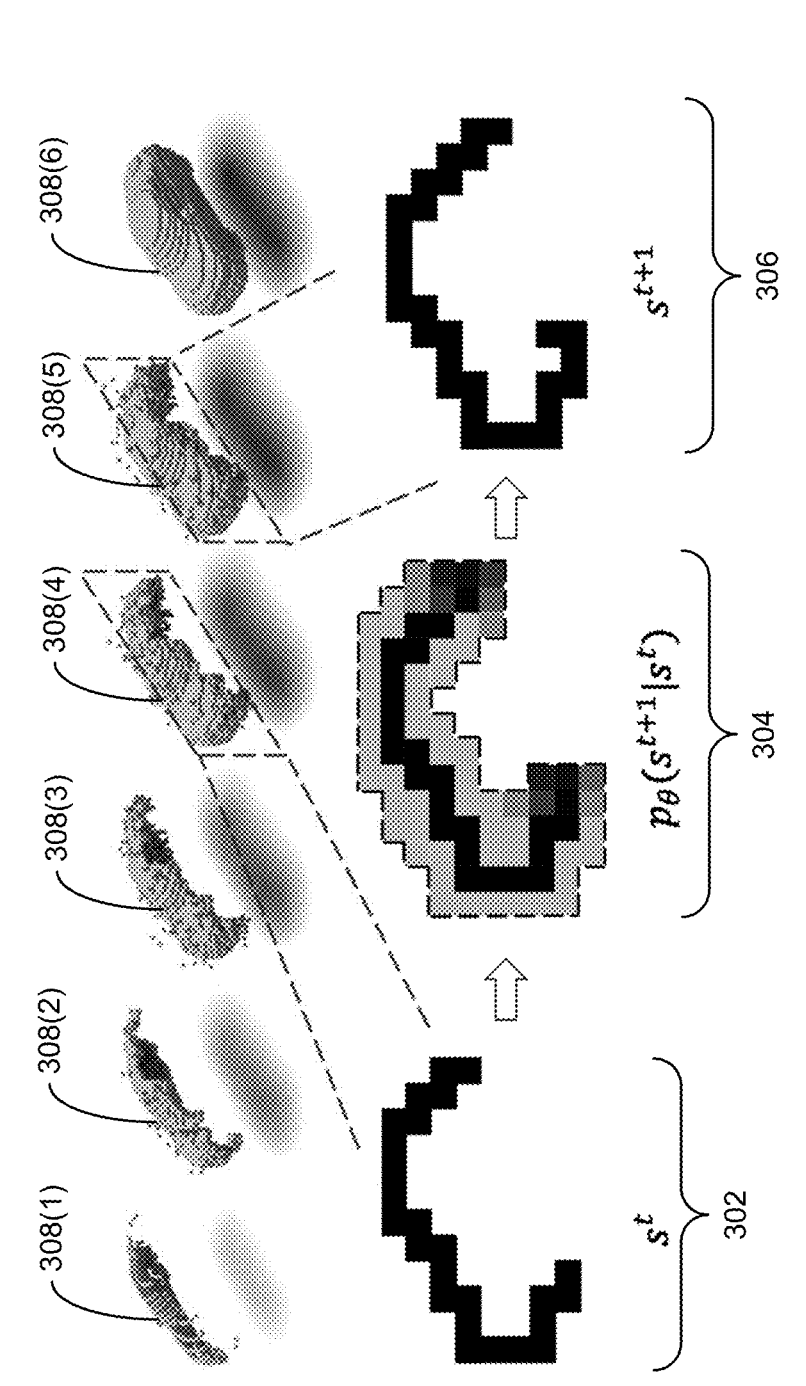
FIG. 3A illustrates the operation of the machine learning model of FIG. 2 in generating a series of iterative updates to a shape, according to various embodiments.

FIG. 3A illustrates the operation of machine learning model 208 of FIG. 2 in generating a series of iterative updates 308(1)-308(6) (each of which is referred to individually herein as iterative update 308) to a shape, according to various embodiments. As shown in FIG. 3A, input into iterative update 308(4) includes a state 302 denoted by $s^t$. State 302 includes a set of black grid cells that represent the surface of the current shape and have occupancies that are set to 1. Machine learning model 208 computes the local transition kernel 304 $p_\theta(s^{t+1} | s^t)$ using the input state 302, and an output state 306 denoted by $s^{t+1}$ is generated by sampling from the local transition kernel 304. This output state 306 includes one or more new cells that have been added to the set of occupied grid cells. Consequently, iterative updates 308 performed by machine learning model 208 can be used to "grow" the surface of the shape over a predefined number of time steps.

In some embodiments, the transition kernel is computed separately for each cell within a certain neighborhood 232 of the set of occupied cells 230:

$$p(s^{t+1} | s^t) = \prod_{c \in \mathcal{N}(s^t)} p_\theta(o_c | s^t) \qquad (3)$$

$$p_\theta(o_c | s^t) = Ber(\lambda_{\theta,c}) \qquad (4)$$

In the above equations, $p_\theta(o_c | s^t)$ is a Bernoulli variable with a mean $\lambda_{\theta,c}$ that is estimated by machine learning model 208 for a cell c, given $s^t$. The transition kernel $p_\theta$ can additionally be conditioned on both the initial state $s^0$ and the current state $s^t$ at each time step.

When a given cell falls within neighborhood 232 of one or more occupied cells 230, a probability distribution of the occupancy for that cell can be derived from transition kernels computed for these occupied cells 230. For example, if an input state $s^t$ for the tth time step includes M occupied cells 230 $s^t = \{c_1, \ldots, c_M\}$, machine learning model 208 may predict the occupancy probability of individual cells using N-dimensional vectors $\mathcal{P} = \{p_1, \ldots, p_M\}$, where N is the number of neighborhood 232 cells fixed by the distance threshold r within the uniform grid $\mathbb{Z}^n$. Each element within a given vector $p_i$ may store a probability for a cell that resides within neighborhood 232 of a corresponding occupied cell $c_i$.

When a given cell resides within neighborhood 232 of multiple occupied cells 230 (e.g., when the given cell falls within neighborhood 232 of two or more adjacent or nearby occupied cells 230), multiple probabilities of occupancy for that cell can be retrieved from the vectors and averaged (and/or otherwise aggregated) into an overall probability distribution for the cell. An occupancy for the cell may then be sampled from the overall probability distribution.

Returning to the discussion of FIG. 2, training engine 122 can train machine learning model 208 using training data 202 that is derived from various types of scans 204. For example, training data 202 may include 3D point clouds that are generated from LiDAR scans collected over multiple scanning passes by a vehicle, robot, and/or another type of LiDAR-equipped object. Training data 202 can also, or instead, include 2D, 3D, or n-dimensional representations of objects, scenes, designs, and/or other types of shapes that are generated using various types of sensors, scanning techniques, and/or modeling techniques.

As shown in FIG. 2, training data 202 includes a set of input geometries 210, a set of visible cells 212, a set of visibility masks 214, and a set of target geometries 216. Input geometries 210 include "incomplete" representations of shapes acquired via scans 204. Each input geometry included in the set of input geometries 210 is additionally paired with a corresponding target geometry included in the set of target geometries 216. This target geometry includes a more complete representation of the shape than the input geometry.

For example, an input geometry included in the set of input geometries 210 may include a single scan and/or an accumulation of a subset of scans 204 for a given object, scene, design, and/or another type of shape. The input geometry may be paired with a target geometry that includes an aggregation or accumulation of all available scans for the same shape. The target geometry may also, or instead, include an accumulation of a greater number of scans for the shape than the input geometry.

In another example, an input geometry included in the set of input geometries 210 may include a subset of available points, voxels, or other locations on the surface and/or boundary of the shape. The input geometry may be paired with a target geometry that includes all available points, voxels, or other locations on the surface and/or boundary of the shape.

When multiple scans 204 are available for a given shape, training engine 122 can use a variety of registration techniques to accumulate points, voxels, or other representations of the shape from some or all of these scans 204 into a corresponding input geometry and/or target geometry. For example, training engine 122 may use a random sample consensus (RANSAC), iterative closest point (ICP), robust point matching (RPM), kernel correlation (KC), coherent point drift (CPD), Simultaneous Localization and Mapping (SLAM), image alignment, and/or deep learning technique to geometrically align scans 204 of the same shape with one another and/or a global coordinate system. Data used to perform this geometric alignment may include (but is not limited to) poses (e.g., positions and orientations) of one or more cameras, LiDAR sensors, and/or other type of sensors used to capture each of these scans 204; points, lines, contours, planes, creases, borders, or other features extracted from these scans 204; and/or artificial targets placed in an environment captured by these scans 204. After some (e.g., all) available scans 204 have been accumulated into a target geometry and/or another "more complete" representation of the shape, training engine 122 can reduce the amount of noise in the more complete representation by filtering "low density" points from the more complete representation.

Visible cells 212 include portions or regions of space that are visible from scans 204 of the corresponding shape. For example, visible cells 212 may include voxels that are occupied by the surface of that shape and detected by a sensor in one or more scans 204. Visible cells 212 may also include voxels that are not occupied by the surface of the shape but are still "visible" to the sensor, such as voxels that lie between the sensor and the surface of the shape.

Figure 3B:
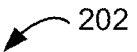
FIG. 3B illustrates how training data for the machine learning model of FIG. 2 is determined, according to various embodiments.

FIG. 3B illustrates how training data 202 for machine learning model 208 of FIG. 2 is determined, according to various embodiments. As shown in FIG. 3B, training data 202 includes an example input geometry 322 and an example target geometry 324 for the same scene. Input geometry 322 includes a sparse set of points from the scene and can be obtained from a single LiDAR scan of the scene. Target geometry 324 includes a denser set of points from the same scene and can be obtained by accumulating multiple LiDAR scans of the scene (e.g., LiDAR scans generated during a single scanning pass of the scene).

While target geometry 324 may correspond to an incomplete representation of the scene (e.g., because the LiDAR scanning pass is unable to capture occluded sides of cars, buildings, trees, and/or other objects in the scene), the relative completeness of target geometry 324 with respect to input geometry 322 provides a training signal that allows machine learning model 208 to learn to generate realistic completions of objects, scenes, and/or other shapes in training data 202. Further, input geometries 210 and target geometries 216 can be derived from scans of different environments and/or multiple scanning passes to allow machine learning model 208 to learn completed representations of the shapes across the corresponding set of training data 202. For example, training data 202 may include input geometries 210 and corresponding target geometries 216 that are generated from LiDAR scanning passes that capture different sides of cars, buildings, trees, and/or other objects that commonly occur in a given type of environment (e.g., an outdoor street scene). When machine learning model 208 is trained using these pairs of input geometries 210 and target geometries 216, machine learning model 208 may learn "complete" representations of these objects across the set of training data 202.

Training data 202 also includes a division 326 of a space occupied by the scene into different types of regions. As shown in FIG. 3B, the regions include one or more visible and occupied regions, one or more visible and unoccupied regions, one or more invisible and occupied regions, and/or one or more invisible and unoccupied regions.

Visible and occupied regions include surfaces that are observed by accumulated scans of the scene (e.g., scans that are used to generate target geometry 324 for the scene). For example, visible and occupied regions may include points on surfaces of a road, cars, trees, buildings, sidewalks, and/or other objects that are detected in the scans. Visible and unoccupied regions include portions of the scene that are verified to be unoccupied, based on the accumulated scans. For example, visible and unoccupied regions may include regions of space between one or more sensors used to capture the scans and the surfaces of shapes detected by the sensor(s).

Invisible and occupied regions include portions of the scene that are occupied by surfaces that are not observed in accumulated scans of the scene. For example, invisible and occupied regions may include sides of a road, cars, trees, buildings, sidewalks, and/or other objects that are not captured in accumulated scans of the scene. Invisible and unoccupied regions include portions of the scene that are neither occupied by surfaces nor observed in accumulated scans of the scene. For example, invisible and unoccupied regions may include portions of the scene that lie outside surfaces of objects in the scene and are not captured in accumulated scans of the scene. Because the invisible and occupied regions cannot be distinguished from the invisible and unoccupied regions using the accumulated scans of the scene, both types of regions are excluded during training of machine learning model 208, as described in further detail below.

Returning to the discussion of FIG. 2, training engine 122 uses visible cells 212 to compute visibility masks 214 associated with the corresponding input geometries 210 and target geometries 216. Each visibility mask in the set of visibility masks 214 identifies one or more portions of an input geometry and/or corresponding target geometry that are visible in the corresponding scans 204. Consequently, visibility masks 214 can encompass both visible and occupied regions and visible and unoccupied regions within the corresponding scenes.

In some embodiments, training engine 122 generates training data 202 from synthetic shapes 206, in lieu of or in addition to generating training data 202 from scans 204 of real-world objects, scenes, or shapes. Synthetic shapes 206 can include models of the same types of objects or scenes as those captured in scans 204. For example, training data 202 that is generated from LiDAR scans 204 of real-world outdoor street scenes may be supplemented with additional training data 202 that is generated from synthetic shapes 206 that include 3D models of one or more synthetic outdoor street scenes.

To generate input geometries 210, visible cells 212, visibility masks 214, and/or target geometries 216 from these types of synthetic shapes 206, training engine 122 can simulate scans 204 of synthetic shapes 206 that reflect parameters and/or conditions associated with real-world scans 204 of the same types of objects, scenes, or shapes. Continuing with the above example, training engine 122 may generate a virtual vehicle with a virtual LiDAR scanner at the same position and orientation as those of a real-world LiDAR scanner on a real-world vehicle used to capture LiDAR scans 204. Training engine 122 may also simulate vehicle trajectories of the virtual vehicle within the synthetic 3D outdoor street scene. For each vehicle trajectory, training engine 122 may use a light transport simulation technique (e.g., ray-casting) to generate a series of simulated LiDAR scans from locations of the virtual LiDAR scanner along the vehicle trajectory. Training engine 122 may then convert the simulated LiDAR scans into corresponding input geometries 210, visible cells 212, visibility masks 214, and target geometries 216 using the techniques described herein.

After training data 202 is generated, training engine 122 uses input geometries 210, visible cells 212, visibility masks 214, and target geometries 216 in training data 202 to train machine learning model 208. More specifically, training engine 122 inputs each input geometry included in the set of input geometries 210 into machine learning model 208 and uses machine learning model 208 to generate a series of iterative updates 228 to the input geometry. For each iterative update, training engine 122 receives, from machine learning model 208, training output 218 that includes predictions 234 of occupancies (or other representations of portions of space occupied by a shape) for cells within a neighborhood of a current set of occupied cells 230 provided as input for that iterative update. Training engine 122 applies visibility masks 214 to training output 218 to determine a set of visible cells 212 associated with training output 218. Training engine 122 additionally computes one or more losses 220 based on training output 218 and updates parameters of machine learning model 208 based on the computed losses 220. For example, training engine 122 could use a training technique (e.g., gradient descent and backpropagation) to iteratively update parameters in machine learning model 208 in a way that minimizes losses 220.

In one or more embodiments, training engine 122 uses an infusion training technique to train machine learning model 208. The infusion training technique involves sampling from a "training chain" that differs from the "model sampling chain" (e.g., a Markov chain) that is subsequently used with the trained machine learning model 208 to generate new shapes. This training chain is used to train machine learning model 208 to generate intermediate states $\tilde{s}^{1:T}$ between a starting shape $s^0$ and a desired shape x. Each successive intermediate state is increasingly biased toward generating a sample that is closer to the desired shape x by progressively "infusing" x into the training chain.

The infusion training technique can supervise training of the transition kernel $p_\theta(s^{t+1}|s^t)$ using the following infusion kernel:

$$q_\theta^t\left(\tilde{s}^{t+1}|\tilde{s}^t, x\right) = \prod_{c \in \mathcal{N}(s^t)} q_\theta^t(o_c|\tilde{s}^t, x) \qquad (5)$$

In the above equation, $$q_\theta^t\left(\tilde{s}^{t+1}|\tilde{s}^t, x\right)$$

represents the infusion kernel and is decomposed as in Equation 3.

For a single cell c, the factorized infusion kernel $$q_\theta^t(o_c|\tilde{s}^t, x)$$

can include the following representation:

$$q_\theta^t(o_c \mid \tilde{s}^t, x) = Ber((1 - \alpha^t)\lambda_{\theta,c} + \alpha^t 1[c \in x]) \qquad (6)$$

In the above equation, the factorized infusion kernel is a Bernoulli variable with a mean that is computed as the estimated probability $\lambda_{\theta,c}$ from machine learning model 208. This mean is "infused" with desired shape x with a weight $\alpha^t=\alpha_1 t+\alpha_0|\alpha^t \in [0,1]$, which increases (e.g., linearly) with t. Consequently, when sampling from the infusion kernel, a value from x is chosen with probability $\alpha^t$, and a value is sampled from the transition kernel generated by machine learning model 208 with probability $1-\alpha^t$.

Using the infusion training technique, training engine 122 recursively samples intermediate infusion states $\tilde{s}^{1:T}$ from the infusion kernel $$q_\theta^t(\tilde{s}^{t+1}|\tilde{s}^t, x).$$

For each sampled state $\tilde{s}^t$, training engine 122 trains machine learning model 208 using losses 220 that are computed for each sampled state $\tilde{s}^t$:

$$\mathcal{L} = - \sum_{c \in \mathcal{N}(\tilde{s}^t)} 1[c \in \mathcal{V}] \sum_{o_c \in \{0,1\}} 1[o_{c,x} = o_c] \log; p_\theta(o_c \mid \tilde{s}^t) \qquad (7)$$

In the above equation, losses 220 are denoted by $\mathcal{L}$ and include a binary cross-entropy loss associated with probabilities of occupancies outputted by machine learning model 208. Additionally, $o_{c,x} \in \{0,1\}$ represents an occupancy of cell c in the ground truth target shape x.

Continuing with the discussion of Equation 7, $\mathcal{V}$ denotes a precomputed set of visible cells 212 from a target geometry. The set of visible cells 212 can be determined using a corresponding visibility mask (e.g., in visibility masks 214), which is computed by applying a truncated signed distance function (TSDF) to a voxel grid into which the target geometry is divided and appending a voxel c to the set of visible cells 212 if the corresponding TSDF value $d_c$ is above a predefined threshold:

$$\mathcal{V} = \{c | d_c > -\epsilon, \epsilon > 0\} \qquad (8)$$

Consequently, Equations 7 and 8 indicate that losses 220 are computed only for visible cells 212 that are within a certain neighborhood 232 of occupied cells 230 associated with the corresponding state $\tilde{s}^t$.

Training engine 122 can also train machine learning model 208 using various combinations of training data 202 derived from real-world scans 204 and synthetic shapes 206. For example, training engine 122 may train machine learning model 208 using batches of training data 202 that include input geometries 210, visible cells 212, visibility masks 214, and target geometries 216 generated from random mixes of real-world scans 204 and synthetic shapes 206. In another example, training engine 122 may perform one or more training stages that train machine learning model 208 using training data 202 derived from real-world scans 204. Training engine 122 may also perform one or more additional training stages that train machine learning model 208 using training data 202 derived from synthetic shapes 206. Stages that involve training data 202 derived from real-world scans 204 may be performed before, after, and/or in an alternating fashion with stages that involve training data 202 derived from synthetic shapes 206.

After training of machine learning model 208 is complete, execution engine 124 uses the trained machine learning model 208 to convert incomplete geometry 226 for one or more objects, a scene, and/or another type of shape into a complete geometry 244 for the same shape. More specifically, execution engine 124 converts incomplete geometry 226 into a starting state associated with the shape. For example, execution engine 124 may convert a point cloud that corresponds to incomplete geometry 226 and is generated via one or more LiDAR scans of the shape into voxel occupancies, signed distance functions, and/or other discretized representations of the space occupied by the surface of incomplete geometry 226.

Execution engine 124 also inputs incomplete geometry 226 into machine learning model 208 and uses machine learning model 208 to generate a number of iterative updates 228 to incomplete geometry 226. As described herein, each of iterative updates 228 includes predictions 234 of occupancy or other representations of space occupied by the surface of the shape for cells that reside within a given neighborhood 232 of a set of occupied cells 230 representing a current state of the shape.

As shown in FIG. 2, execution engine 124 also applies one or more filters 236 to predictions 234 generated by machine learning model 208 before updating occupied cells 230 based on predictions 234. In some embodiments, filters 236 are used to remove occupied cells 230 that lie between an occupied cell in incomplete geometry 226 and a sensor used to capture or detect the cell. For example, execution engine 124 may trace a ray from each occupied cell in incomplete geometry 226 and the sensor used to detect the occupied cell. Execution engine 124 may also remove, from the set of occupied cells 230, any cells that lie along the ray between the occupied cell and the sensor (i.e., because these cells would otherwise block the detection of the occupied cell in incomplete geometry 226 by the sensor).

In one or more embodiments, filters 236 may also, or instead, include one or more thresholds that are applied to some or all predictions 234 generated by machine learning model 208. For example, execution engine 124 may periodically (e.g., every X iterative updates 228, for Y consecutive iterative updates 228 out of every Z iterative updates 228, etc.) apply a numeric threshold (e.g., 0.5) to an overall (e.g., aggregated) probability of occupancy generated by machine learning model 208 for each cell within a given neighborhood 232 of a current set of occupied cells 230. This numeric threshold may be applied in lieu of or in addition to sampling from the overall probability to determine whether or not the cell is occupied. When the overall probability meets or exceeds the threshold, execution engine 124 may add the cell to the set of occupied cells 230 and use the updated set of occupied cells 230 as input into the next iterative update. When the overall probability does not meet or does not exceed the threshold, execution engine 124 may omit the cell from the set of occupied cells 230 used as input into the next iterative update.

In some embodiments, filters 236 that involve thresholds applied to probabilities and/or other predictions 234 associated with individual iterative updates 228 allows execution engine 124 to remove noisy "low probability" outliers from occupied cells 230. For example, execution engine 124 may alternate between one or more iterative updates 228 that generate an updated set of occupied cells 230 by sampling from probabilities of occupancies for cells within a given neighborhood 232 of a current set of occupied cells 230 and one or more iterative updates 228 that generate an updated set of occupied cells 230 by applying a threshold to probabilities of occupancies for cells within a given neighborhood 232 of a current set of occupied cells 230. By regularly updating occupied cells 230 using thresholds for probabilities of occupancies, execution engine 124 may reduce the frequency with which noisy cells that are generated by sampling from low probabilities of occupancies are added to the set of occupied cells 230.

Execution engine 124 can continue adding occupied cells 230 to incomplete geometry 226 over a certain number of iterative updates 228. For example, execution engine 124 may use machine learning model 208 to perform a fixed number of iterative updates 228 to incomplete geometry 226. Execution engine 124 may also, or instead, use machine learning model 208 to perform a variable number of iterative updates 228 to incomplete geometry 226, with the number of iterative updates 228 determined based on a measure of change in occupied cells 230 between consecutive iterative updates 228, a number of occupied cells 230 added to incomplete geometry 226 over these iterative updates 228, the ratio of the number of occupied cells 230 added to incomplete geometry 226 over iterative updates 228 to the number of occupied cells 230 in incomplete geometry 226, and/or another condition.

After iterative updates 228 are complete, execution engine 124 uses occupied cells "grown" over iterative updates 228 to generate complete geometry 244 for the corresponding shape. For example, execution engine 124 may apply a threshold to final predictions 234 of occupancy probabilities for cells in neighborhood 232 of occupied cells 230 associated with the final iterative update. Execution engine 124 may add cells that meet the threshold to the set of occupied cells and convert the occupied cells into a discrete voxel-based representation of surfaces in the shape. Execution engine 124 may also use a marching cubes technique and/or another iso-surface extraction technique to convert the discrete voxel-based representation into a polygon mesh representation of the surfaces in the shape.

While the training and execution of machine learning model 208 has been described with respect to generating completions of n-dimensional shapes, it will be appreciated that machine learning model 208 can be adapted to process additional types of data and/or generate predictions 234 of additional attributes associated with objects, scenes, and/or shapes. For example, machine learning model 208 may be trained to generate training output 218 that includes class labels for voxels and/or other regions of space occupied by various types of objects (e.g., cars, trucks, bicycles, trees, buildings, road surfaces, sidewalks, pedestrians, etc.) depicted in scans 204 and/or synthetic shapes 206. During training of machine learning model 208, losses 220 may include a focal loss that modulates the binary cross-entropy loss so that machine learning model 208 focuses on harder and/or misclassified examples. Thus, that a class that is assigned to a higher proportion of visible cells 212 within training data 202 (e.g., a class for a road surface) and/or a class for which machine learning model 208 outputs labels with high confidence may be associated with a lower weight in losses 220 than a class that is assigned to a lower proportion of visible cells 212 within training data 202 (e.g., a class for a car or pedestrian) and/or a class for which machine learning model 208 outputs labels with lower confidence. The trained machine learning model 208 may then be used to convert a given incomplete geometry 226 (with or without class labels for regions occupied by incomplete geometry 226) into a corresponding complete geometry 244 and predictions of classes for regions of space occupied by complete geometry 244.

In another example, machine learning model 208 may be trained to generate training output 218 that includes colors for voxels and/or other regions of space occupied by various objects depicted in scans 204 and/or synthetic shapes 206. The trained machine learning model 208 may then be used to convert a given incomplete geometry 226 (with or without colors assigned to regions occupied by incomplete geometry 226) into a corresponding complete geometry 244 and colors for regions of space occupied by complete geometry 244.

In a third example, machine learning model 208 may be trained to generate one or more target geometries 216, given the corresponding input geometries 210 and latent encodings that capture the global context (e.g., type of shape or scene, location, scale, directionality, layout, etc.) associated with the corresponding shapes. The trained machine learning model 208 may then be used to generate a new complete geometry 244, given input that includes a corresponding incomplete geometry 226 and a latent encoding that provides context for complete geometry 244.

As mentioned above, simulation engine 126 uses complete geometry 244 and/or other output generated by machine learning model 208 to conduct a simulation 242. For example, simulation engine 126 may use complete geometry 244 for a vehicle, a piece of furniture, a building, a tool, and/or another object within a physics-based simulation 242 that tests the behavior of the object under a structural load, during a collision with another object, in the presence of a fluid flow, and/or under another set of physical conditions. In another example, simulation engine 126 may use complete geometry 244 for a particular type of scene (e.g., indoor environment, outdoor street scene, etc.) in simulation 242 that tests or verifies the ability of an autonomous vehicle, semi-autonomous vehicle, drone, robot, and/or another type of machine to navigate within the scene and/or interact with objects, people, and/or other entities in the scene. In a third example, simulation engine 126 may use complete geometry 244 within a game, an AR environment, a VR environment, an MR environment, and/or another type of environment that utilizes models of shapes.

Complete geometry 244 and/or other output generated by machine learning model 208 can also be used in other applications and/or contexts. For example, complete geometry 244, class labels associated with complete geometry 244, colors associated with complete geometry 244, and/or other output generated by machine learning model 208 may be used to train one or more additional machine learning models to perform n-dimensional object detection, semantic segmentation, path planning, obstacle avoidance, and/or other types of tasks.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 500 of FIGS. 5A-5D, example computing device 600 of FIG. 6, and/or example data center 700 of FIG. 7.

Figure 4:
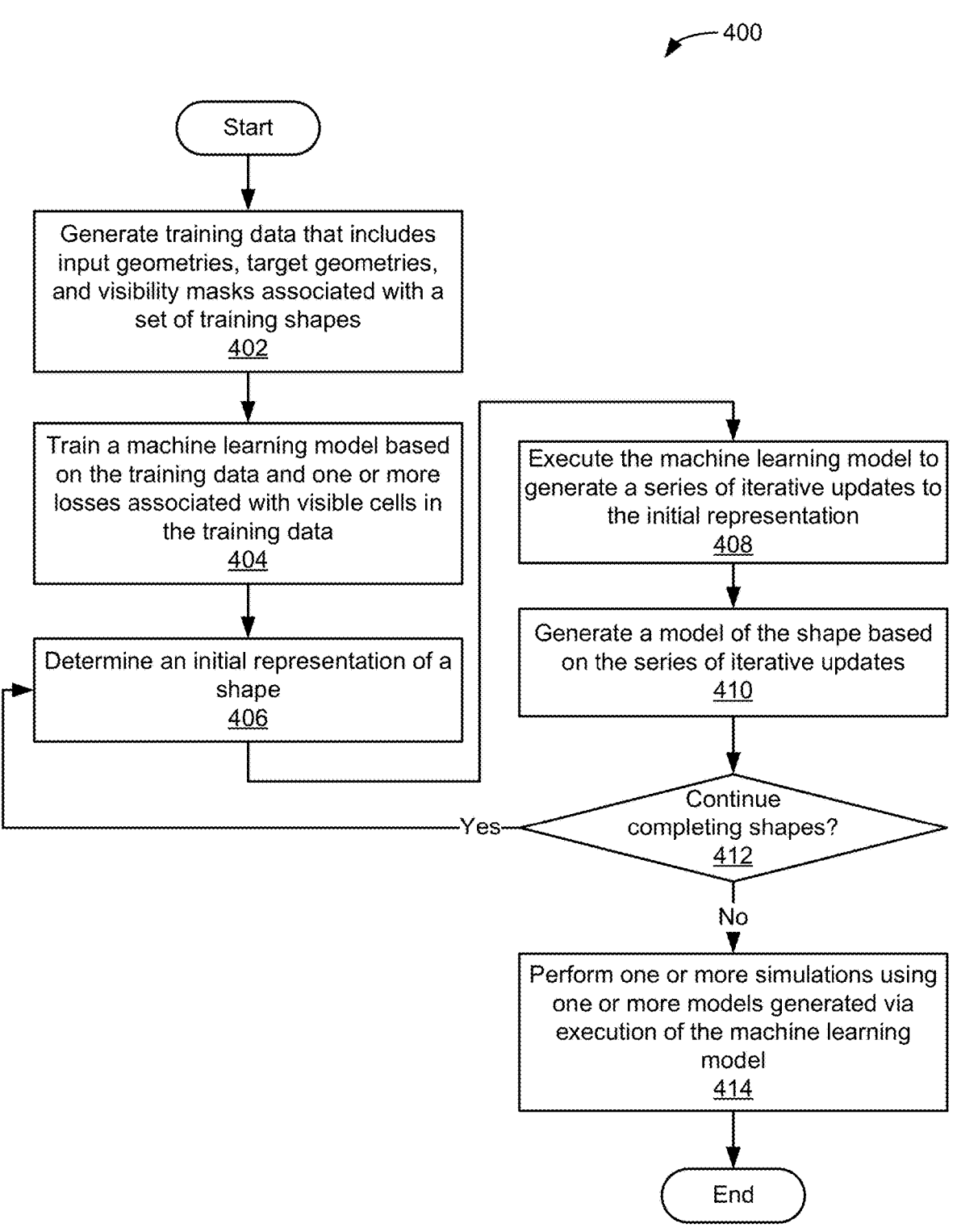
FIG. 4 illustrates a flow diagram of a method for performing 3D scene completion, according to various embodiments.

Now referring to FIG. 4, each block of method 400, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 400 is described, by way of example, with respect to the system of FIG. 1. However, these methods may additionally or alternatively be executed by any one system, or any combination of systems, including, but not limited to, those described herein. Further, the operations in method 400 can be omitted, repeated, and/or performed in any order without departing from the scope of the present disclosure.

FIG. 4 illustrates a flow diagram of a method 400 for performing 3D scene completion, according to various embodiments. As shown in FIG. 4, method 400 begins with operation 402, in which training engine 122 generates training data that includes input geometries, target geometries, and visibility masks associated with a set of training shapes.

For example, training engine 122 may obtain a set of real and/or simulated scans of outdoor street scenes, indoor environments, cars, buildings, and/or other types of real and/or synthetic training shapes. Training engine 122 may generate each input geometry from a subset of available scans for a corresponding training shape. Training engine 122 may also generate a target geometry that is paired with the input geometry from all available scans (or a larger number of scans) for the corresponding training shape. Training engine 122 may additionally compute one or more visibility masks that identify grid cells and/or other regions of the input geometry and/or target geometry that are visible from one or more real or virtual sensors used to generate the scans.

In operation 404, training engine 122 trains a machine learning model based on the training data and one or more losses associated with visible cells in the training data. For example, training engine 122 may use the machine learning model to recursively generate a certain number of iterative updates to a given input geometry. For each visible cell associated with a given iterative update, training engine 122 may compute an infusion kernel that is "infused" with a value of the target geometry (e.g., an occupancy value) at that cell with a certain probability. This probability may increase as a function of the number of time steps associated with the iterative updates. Training engine 122 may also sample an intermediate infusion state for each time step from the corresponding infusion kernel and provide the sampled intermediate infusion state as input into the machine learning model. Training engine 122 may compute a binary cross-entropy loss, focal loss, and/or another type of loss between samples from the transition kernel generated by the machine learning model from the input and the corresponding ground truth target geometry. Training engine 122 may then use a training technique (e.g., gradient descent and backpropagation) to update parameters of the machine learning model in a way that reduces the loss.

In operation 406, execution engine 124 determines an initial representation of a shape. For example, execution engine 124 may convert a point cloud, polygon mesh, and/or another n-dimensional incomplete geometry for the shape into a set of occupancies, SDFs, and/or another discretized representation of the incomplete geometry.

In operation 408, execution engine 124 executes the machine learning model to generate a series of iterative updates to the initial representation. For example, execution engine 124 may use the trained machine learning model to recursively generate a certain number of iterative updates to occupancies, SDFs, and/or representations of regions of space occupied by the shape. During each iterative update, execution engine 124 may use the trained machine learning model to compute a transition kernel that includes probabilities of occupancy for a set of visible cells that reside within a neighborhood of each occupied cell associated with the previous iterative update. Execution engine 124 may also average and/or otherwise aggregate occupancy probabilities computed for all cells within the neighborhood of the occupied cells associated with the previous update and sample from the aggregated occupancy probabilities to determine an updated set of occupied cells associated with the current update.

Execution engine 124 can also filter output associated with the machine learning model during some or all of the iterative updates. For example, execution engine 124 may periodically and/or regularly apply a threshold to probabilities associated with transition kernels generated by the machine learning model to generate updated sets of occupied cells for the corresponding iterative updates. Execution engine 124 may also, or instead, remove occupied cells that fall between a sensor used to capture the initial representation and the original set of cells in the initial representation after some or all iterative updates.

In operation 410, execution engine 124 generates a model of the shape based on the series of iterative updates. For example, execution engine 124 may apply a threshold to final predictions of occupancies for cells in the neighborhood of occupied cells associated with the final iterative update. Execution engine 124 may add cells that meet the threshold to the set of occupied cells and convert the occupied cells into a discrete voxel-based representation of surfaces in the shape. Execution engine 124 may also use a marching cubes technique and/or another iso-surface extraction technique to convert the discrete voxel-based representation into a polygon mesh representation of the surfaces in the shape.

In operation 412, execution engine 124 determines whether or not to continue completing shapes. For example, execution engine 124 may determine that completion of shapes is to continue while incomplete geometries are available for these shapes and the machine learning model has not yet been used to convert the incomplete geometries into corresponding complete geometries for the same shapes. Execution engine 124 may also, or instead, determine that completion of shapes is to continue until a certain number of complete geometries have been generated and/or another condition is met.

In operation 414, simulation engine 126 performs one or more simulations using one or more models generated via execution of the machine learning model. For example, simulation engine 126 may use a 2D, 3D, and/or n-dimensional model of an object corresponding to a shape that was completed by the machine learning model in a simulation that tests the behavior of the object under a structural load, during a collision with another object, in the presence of a fluid flow, and/or in another physical environment. In another example, simulation engine 126 may use a model of a particular type of scene (e.g., indoor environment, outdoor street scene, etc.) that was completed by the machine learning model in a simulation that tests or verifies the ability of an autonomous vehicle, semi-autonomous vehicle, drone, robot, and/or another type of machine to navigate within the scene and/or interact with other entities in the scene. In a third example, simulation engine 126 may use a completed geometry generated by the machine learning model within a game, an AR environment, a VR environment, an MR environment, and/or another type of environment that utilizes models of shapes.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, generative AI, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems implemented at least partially with one or more language models, systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 5A:
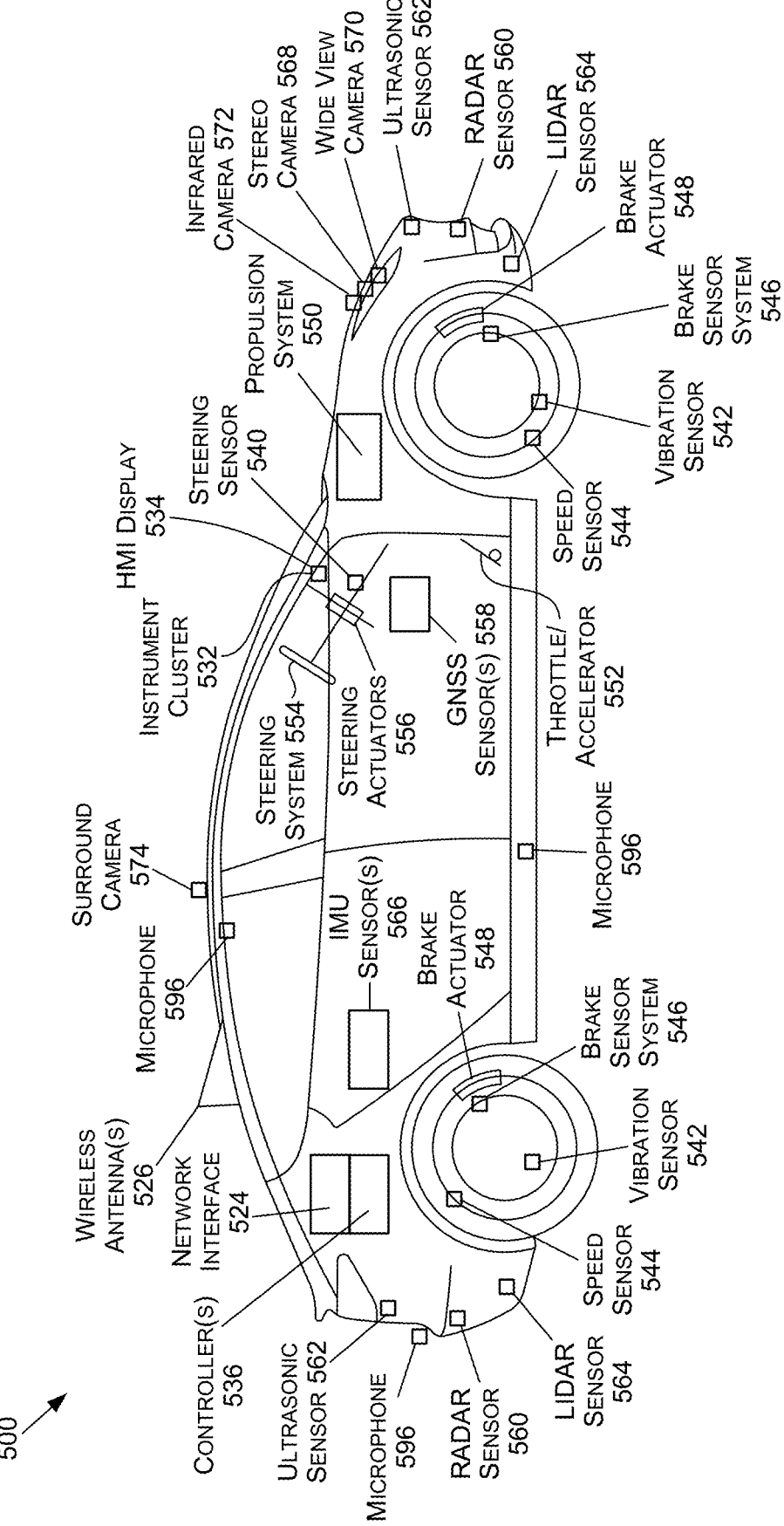
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. The vehicle 500 may be capable of functionality in accordance with one or more of Level 1-Level 5 of the autonomous driving levels. For example, the vehicle 500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 500 or other machine, such as being fully autonomous, being highly autonomous, being conditionally autonomous, being partially autonomous, providing assistive autonomy, being semi-autonomous, being primarily autonomous, or other designation.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems ("GNSS") sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the High Definition ("HD") map 522 of FIG. 5C), location data (e.g., the vehicle's 500 location, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 526 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 5B:
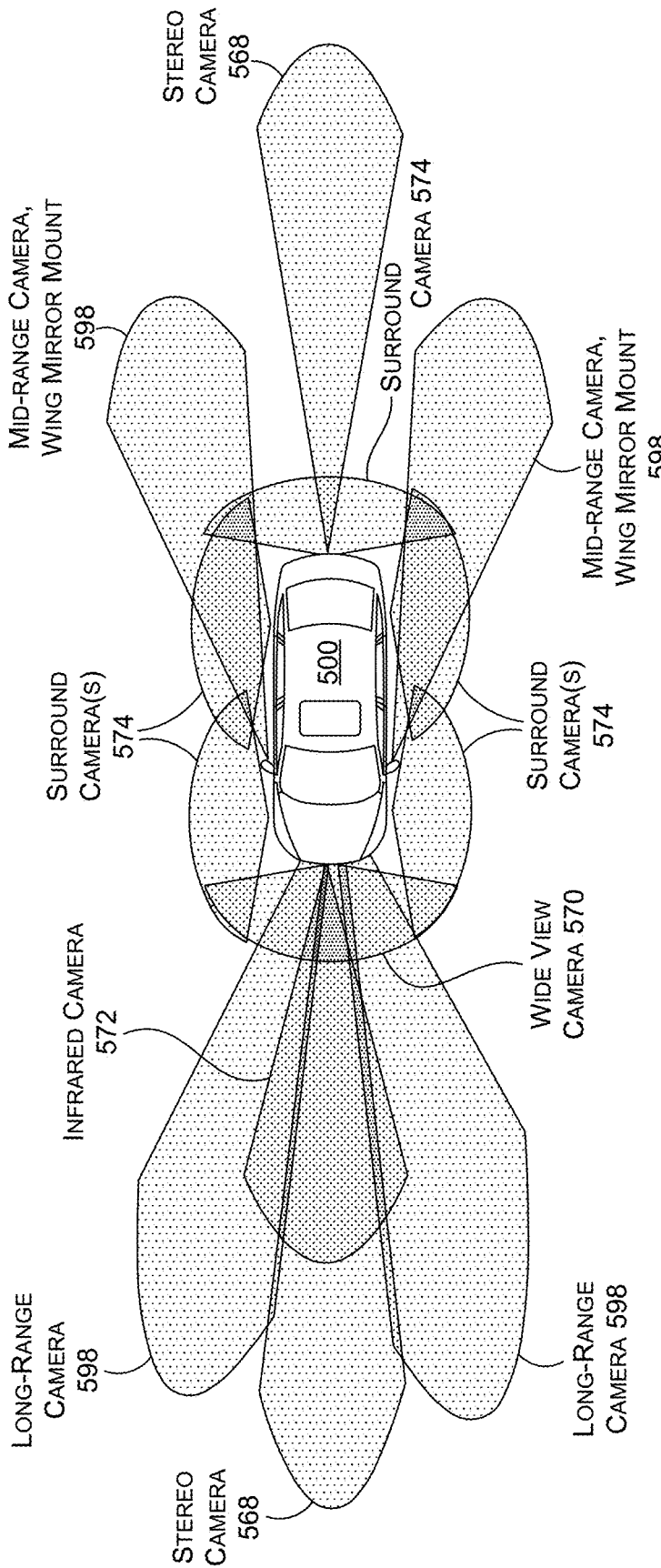
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may be any number (including zero) of wide-view cameras 570 on the vehicle 500. In addition, any number of long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

Any number of stereo cameras 568 may also be included in a front-facing configuration. In at least one embodiment, one or more of stereo camera(s) 568 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
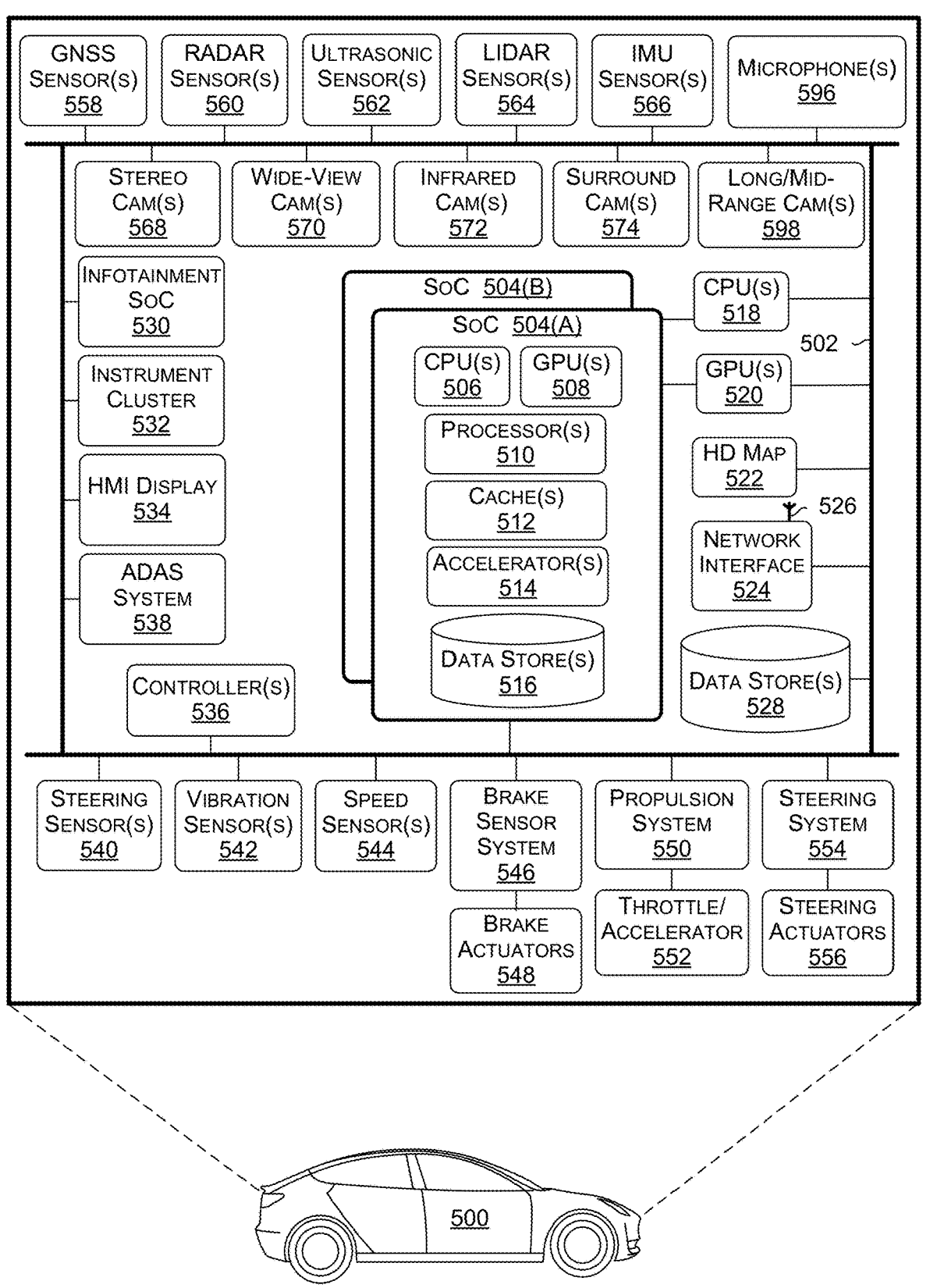
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s)

512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))— or other math coprocessor or numeric coprocessor types— for performing mathematical operations within the system. For example, the SoC(s) 504 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 500 m, with an accuracy of 2 cm-3 cm, and with support for a 500 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some embodiments, the training data may include incomplete and/or complete geometries for objects, scenes, and/or other types of shapes that can be encountered by the vehicles.

In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
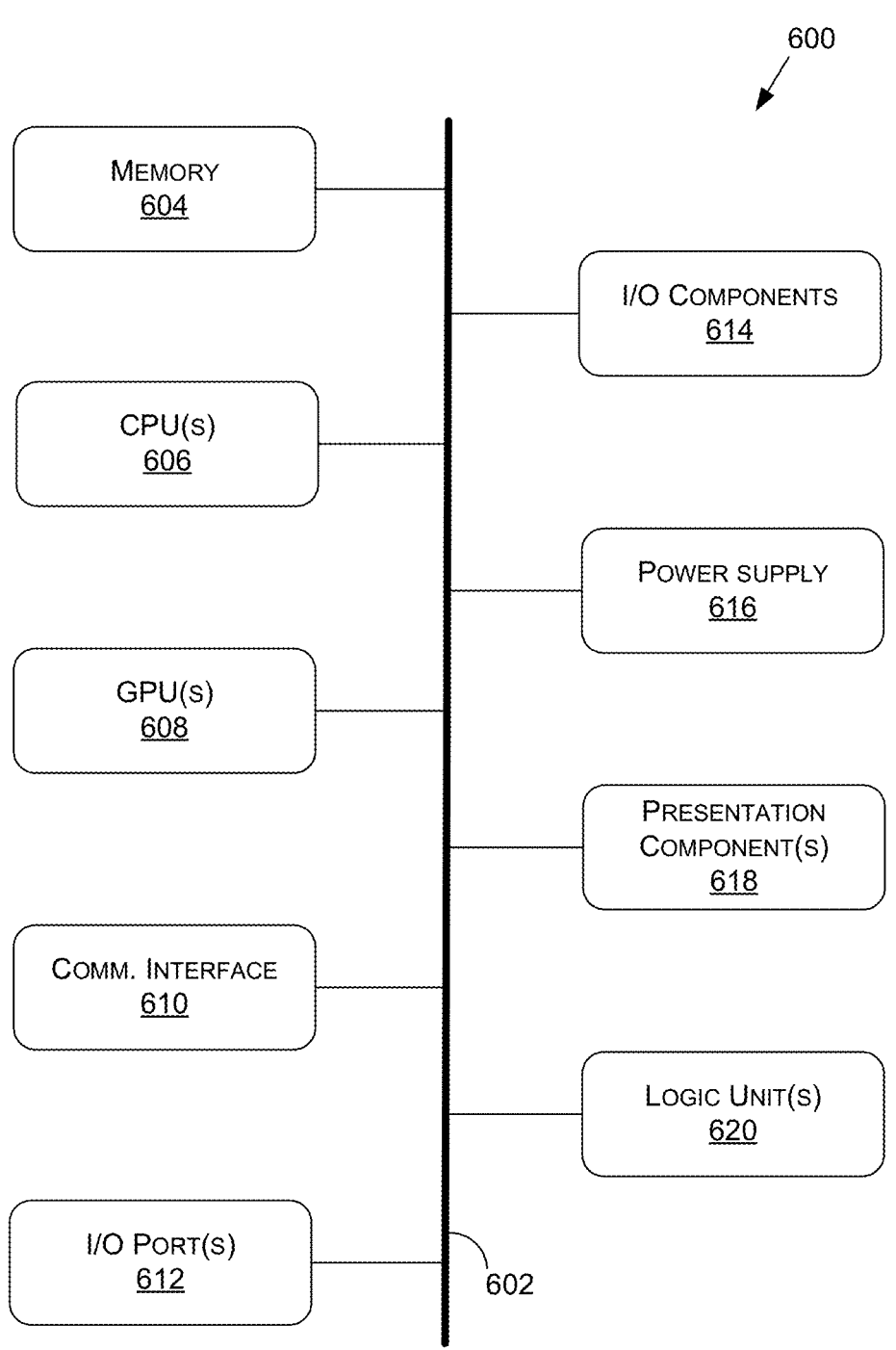
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units.

As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
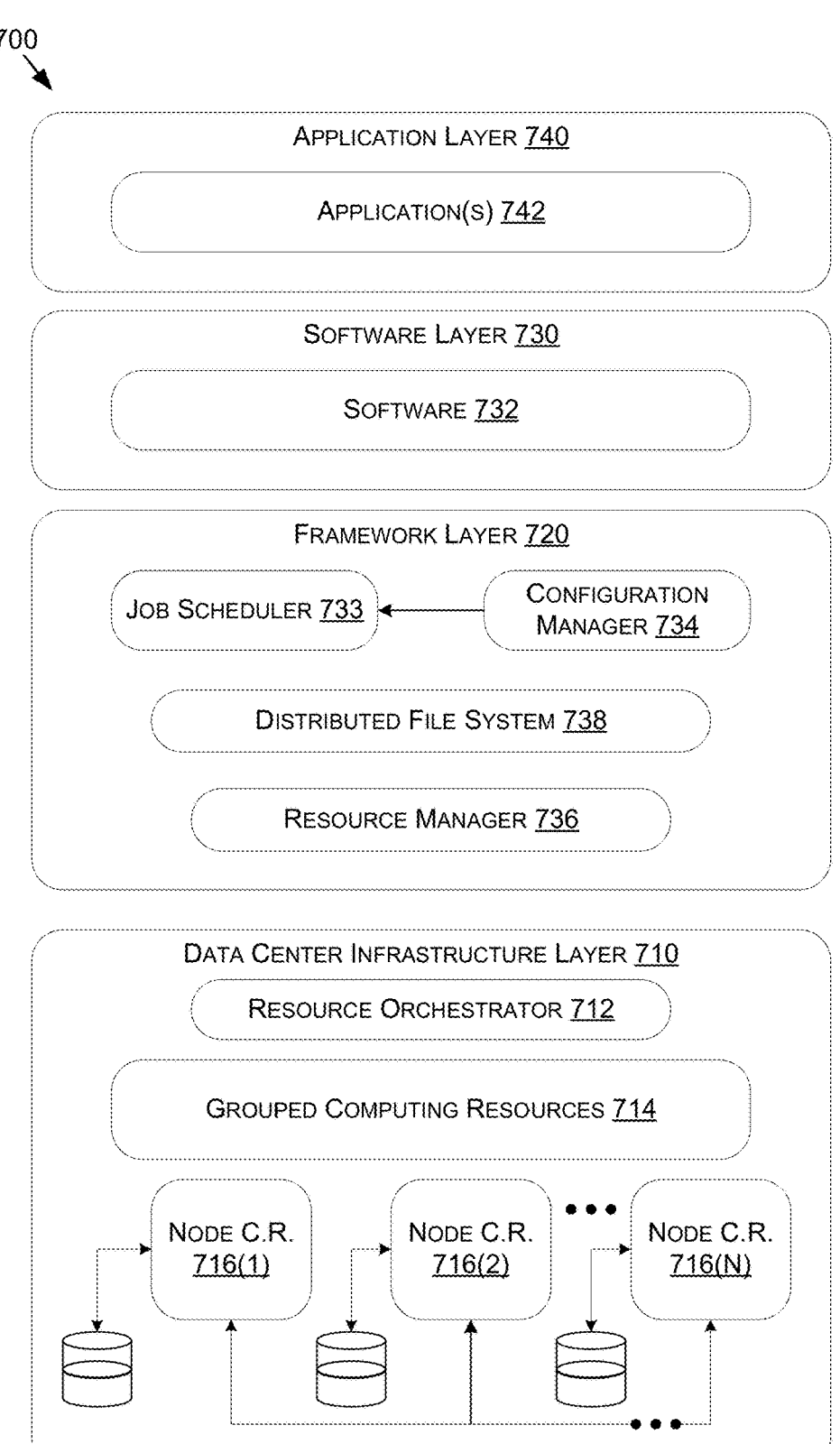
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-716(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein. In some embodiments, trained or deployed machine learning models may be used to generate complete geometries for scenes, objects, and/or other types of shapes, given input that includes incomplete geometries for the same shapes.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

In sum, the disclosed techniques train and execute a machine learning model to iteratively convert an incomplete representation of an object, scene, and/or another shape into a more complete representation of the same shape. For example, the machine learning model may incrementally "grow" a set of cells depicting a partial light detection and ranging (LiDAR) scan of humans, buildings, cars, objects, terrain, or other elements of a 3D scene into fuller representations of the elements, including portions or sides of the elements that were not captured by the partial LiDAR scan.

The machine learning model can include a sparse convolutional neural network (CNN) and/or another type of deep learning model that iteratively updates a set of states for a new set of cells within a certain distance or neighborhood of a "current" set of cells for which states have already been determined. The set of states includes predicted probabilities of occupancies (or other discretized representations of 3D shapes or surfaces of shapes) for the new set of cells. After states are determined for a new set of cells, the new set of cells is added to the current set of cells, and the process is repeated for a predetermined number of steps.

The machine learning model is trained to predict a series of intermediate states between a first representation of a training 3D scene and a second representation of the training 3D scene. The first representation may include partial geometry for the training 3D scene that is derived from a single scan or a subset of LiDAR scans of the training 3D scene, and the second representation may include a denser but still incomplete geometry for the training 3D scene that is derived from complete set of scans of the training 3D scene. The machine learning model can also be trained using a loss function that is computed using points that are visible in the 3D scans. When the machine learning model is trained using a dataset of incomplete geometries derived from a large number of accumulated LiDAR scans, the machine learning model is able to learn to complete geometries for various types of objects in the training 3D scenes across the dataset. For example, training the machine learning model to generate different portions of cars, trees, buildings, or other types of objects in the training 3D scenes may allow the machine learning model to learn to generate complete geometries for these objects in other 3D scenes.

One technical advantage of the disclosed techniques relative to prior approaches is the ability to generate complete geometries of complex 3D scenes from partial geometries for the same 3D scenes. Consequently, the disclosed techniques can be used to create diverse and realistic 3D environments for use in simulations, training additional machine learning models, designs, games, virtual reality, augmented reality, mixed reality, and/or other applications without performing time- and resource-intensive 3D modeling or 3D scanning operations. Additionally, the disclosed techniques can be used to train a machine learning model to generate complete geometries for various types of 3D shapes, given training data that includes incomplete representations of the same types of 3D shapes. The machine learning model is thus able to generate a greater diversity of 3D shapes than a conventional machine learning model that is trained using a smaller set of complete geometries for 3D shapes.

1. In some embodiments, a method comprises determining an initial representation of a three-dimensional (3D) scene; generating, using a machine learning model, a first update to the initial representation at a previous time step and a second update to the initial representation at a current time step, wherein the second update is generated based at least on a set of predictions corresponding to the first update; and generating a 3D model of the 3D scene based at least on the second update to the initial representation.

2. The method of clause 1, wherein the machine learning model was trained using a loss that is computed based at least on a set of visible cells included in one or more training 3D scenes.

3. The method of any of clauses 1-2, wherein the machine learning model was trained to generate a target geometry derived from a first set of scans of a training 3D scene based at least on an input geometry derived from a subset of the first set of scans of the training 3D scene.

4. The method of any of clauses 1-3, wherein the machine learning model was trained to generate a series of intermediate states between a first representation of a training 3D scene and a second representation of the training 3D scene.

5. The method of any of clauses 1-4, wherein generating the first update and the second update comprises applying a threshold to the set of predictions to determine a first set of cells corresponding to the first update; and generating, via the machine learning model based at least on the first set of cells, the second update that includes a second set of predictions for a second set of cells located within a neighborhood of the first set of cells.

6. The method of any of clauses 1-5, wherein generating the second set of predictions for the second set of cells comprises aggregating a plurality of probabilities associated with a cell included in the second set of cells into an overall probability associated with the cell.

7. The method of any of clauses 1-6, wherein the set of predictions comprises a probability of an occupancy for a point included in the 3D scene.

8. The method of any of clauses 1-7, wherein determining the initial representation comprises converting one or more scans of the 3D scene into the initial representation.

9. The method of any of clauses 1-8, wherein the initial representation comprises a set of voxel occupancies.

10. The method of any of clauses 1-9, wherein the machine learning model comprises a sparse convolutional neural network.

11. In some embodiments, a processor comprises one or more circuits to perform operations comprising determining an initial representation of a three-dimensional (3D) shape; generating, using a machine learning model, a first update to the initial representation at a previous time step and a second update to the initial representation at a current time step, wherein the second update is generated based at least on a set of predictions corresponding to the first update; and generating a model of the 3D shape based at least on the second update to the initial representation.

12. The processor of clause 11, wherein the machine learning model was trained to generate a target geometry derived from a first set of scans of a second 3D shape based at least on an input geometry derived from a second set of scans of the second 3D shape, and wherein the second set of scans corresponds to a subset of the first set of scans.

13. The processor of any of clauses 11-12, wherein the machine learning model was further trained using at least one of a binary cross-entropy loss associated with a set of visible cells included in one or more scans of a set of training 3D shapes; or one or more sets of simulated scans of a set of synthetic 3D shapes.

14. The processor of any of clauses 11-13, wherein generating the first update and the second update comprises determining a first set of cells included in the first update; for at least one cell included in the first set of cells, computing a transition kernel for a second set of cells within a neighborhood of the cell; and sampling from the transition kernel to generate the second update.

15. The processor of any of clauses 11-14, wherein the operations further comprise generating a simulation based at least on the model.

16. The processor of any of clauses 11-15, wherein the simulation comprises at least one of a collision simulation, a driving simulation, or a structural load simulation.

17. The processor of any of clauses 11-16, wherein generating the model comprises determining one or more 3D cells associated with the second update that are located between a sensor used to capture the initial representation and a set of 3D cells included in the initial representation; and omitting the one or more 3D cells from the model.

18. The processor of any of clauses 11-17, wherein the processor is comprised in at least one of a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system for generating synthetic data; a system incorporating one or more virtual machines (VMs); a system implemented at least partially in a data center; or a system implemented at least partially using cloud computing resources.

19. In some embodiments, a system comprises one or more processing units to execute operations comprising generating an input geometry based at least on a first set of scans of a shape; generating a target geometry based at least on a second set of scans of the shape, wherein the first set of scans corresponds to a subset of the second set of scans; executing a machine learning model to generate a first update to the input geometry at a previous time step and a second update to the input geometry at a current time step; and updating the machine learning model using one or more losses that are computed based at least on a set of visible cells associated with at least one of the first update or the second update.

20. The system of clause 19, wherein the system is comprised in at least one of a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system for generating synthetic data; a system incorporating one or more virtual machines (VMs); a system implemented at least partially in a data center; or a system implemented at least partially using cloud computing resources.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
determining an initial representation of a three-dimensional (3D) scene including a first set of cells;
computing a transition kernel for a second set of cells within a neighborhood of at least one cell included in the first set of cells;
generating, using a machine learning model, a first update to the initial representation at a previous time step and a second update to the initial representation at a current time step, the second update generated based on sampling the transition kernel and on at least on a set of predictions associated with the first set of cells; and
generating a 3D model of the 3D scene based at least on the second update to the initial representation.

2. The method of claim 1, wherein the machine learning model was trained using a loss that is computed based at least on a set of visible cells included in one or more training 3D scenes.

3. The method of claim 1, wherein the machine learning model was trained to generate a target geometry derived from a first set of scans of a training 3D scene based at least on an input geometry derived from a subset of the first set of scans of the training 3D scene.

4. The method of claim 1, wherein the machine learning model was trained to generate a series of intermediate states between a first representation of a training 3D scene and a second representation of the training 3D scene.

5. The method of claim 1, wherein generating the first update and the second update comprises:
applying a threshold to the set of predictions to determine the first set of cells corresponding to the first update; and
generating, via the machine learning model based at least on the first set of cells, the second update that includes a second set of predictions for the second set of cells located within a neighborhood of the first set of cells.

6. The method of claim 5, wherein generating the second set of predictions for the second set of cells comprises aggregating a plurality of probabilities associated with a cell included in the second set of cells into an overall probability associated with the cell.

7. The method of claim 1, wherein determining the initial representation comprises converting one or more scans of the 3D scene into the initial representation.

8. The method of claim 1, wherein the initial representation comprises a set of voxel occupancies.

9. The method of claim 1, wherein the machine learning model comprises a sparse convolutional neural network.

10. A processor comprising:

one or more circuits to perform operations comprising:

determining an initial representation of a three-dimensional (3D) scene including a first set of cells;

computing a transition kernel for a second set of cells within a neighborhood of at least one cell included in the first set of cells;

generating, using a machine learning model, a first update to the initial representation at a previous time step and a second update to the initial representation at a current time step, the second update generated based on sampling the transition kernel and on at least on a set of predictions associated with the first set of cells; and generating a 3D model of the 3D scene based at least on the second update to the initial representation.

11. The processor of claim 10, wherein the machine learning model was trained to generate a target geometry derived from a first set of scans of a second 3D shape based at least on an input geometry derived from a second set of scans of the second 3D shape, and wherein the second set of scans corresponds to a subset of the first set of scans.

12. The processor of claim 10, wherein the machine learning model was further trained using at least one of:

a binary cross-entropy loss associated with a set of visible cells included in one or more scans of a set of training 3D shapes; or one or more sets of simulated scans of a set of synthetic 3D shapes.

13. The processor of claim 10, wherein the operations further comprise generating a simulation based at least on the model.

14. The processor of claim 13, wherein the simulation comprises at least one of a collision simulation, a driving simulation, or a structural load simulation.

15. The processor of claim 10, wherein generating the model comprises:

determining one or more 3D cells associated with the second update that are located between a sensor used to capture the initial representation and a set of 3D cells included in the initial representation; and omitting the one or more 3D cells from the model.

16. The processor of claim 10, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, augmented reality content, or mixed reality content;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

17. A system comprising:

one or more processing units to execute operations comprising:

generating an input geometry based at least on a first set of scans of a shape;

generating a target geometry based at least on a second set of scans of the shape, wherein the first set of scans corresponds to a subset of the second set of scans;

executing a machine learning model to generate a first update to the input geometry at a previous time step and a second update to the input geometry at a current time step, including, for at least one cell included in the first set of cells, computing a transition kernel for a third set of cells within a neighborhood of the cell, wherein the second update is generated based at least on a set of predictions associated with a first set of cells and corresponding to the first update and a set of probabilities indicating occupancy within a 3D scene for a second set of cells located within a neighborhood of the first set of set of cells, and including sampling from the transition kernel to generate the second update; and updating the machine learning model using one or more losses that are computed based at least on a set of visible cells associated with at least one of the first update or the second update.

18. The system of claim 17, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system for generating or presenting at least one of virtual reality content, augmented reality content, or mixed reality content;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

\* \* \* \* \*